Patented Nov. 17, 1942

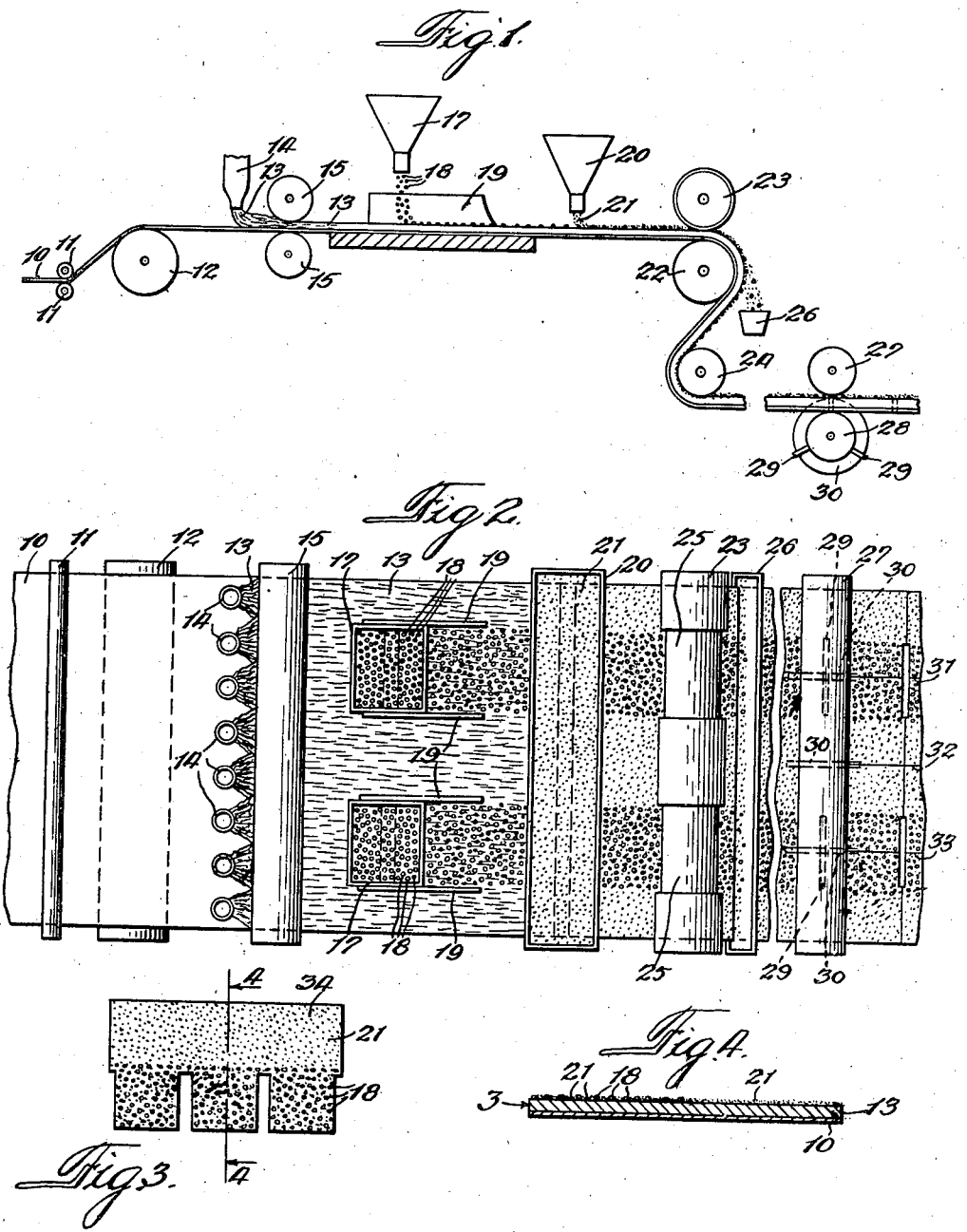

2,302,183

UNITED STATES PATENT OFFICE 2,302,183

ROOFING MATERIAL

Frank B. Burns, Chicago, Ill., assignor to United States Gypsum Company, Chicago, Ill., a corporation of Illinois Original application February 28, 1938, Serial No. 193,027. Divided and this application August 10, 1940, Serial No. 352,069

5 Claims. (Cl. 108—7)

The invention relates to roofing materials, and this application is a division of my prior application Serial No. 193,027, filed February 28, 1938, and entitled "Methods and apparatus for manufacturing roofing materials." More particularly, the invention relates to roofing shingles having an exposed weather portion of increased thickness and a lap portion of reduced thickness adapted to be overlapped by the weather portion of the next adjacent course of shingles, and it is an object of the invention to provide an improved product of this character.

Various methods and apparatus have heretofore been proposed for manufacturing roofing elements or shingles of the character referred to above. For example, it has been proposed to apply to one portion of the usual foundation element a plurality of layers of granule surfaced asphalt or similar plastic material so as to build up a weather portion of increased thickness, the lap portion consisting of a single layer of granule surfaced asphalt. It has likewise been proposed to form the weather portion of increased thickness by employing a single thick coating of asphalt for the weather portion and a thin coating of asphalt for the lap portion, both portions being surfaced with suitable granules. Such methods, of course, require rather complicated and expensive apparatus and an increased amount of plastic and granular material.

Furthermore, roofing elements of this character have been formed by surfacing the weather portion of the element with relatively coarse granules and the lap portion thereof with relatively fine granules. In such a construction, however, the raw asphalt coating may be exposed to the weather between the large granules, and this condition reduces considerably the weathering characteristics of the element at the very portions where good weathering characteristics are of primary importance.

It is accordingly a further object of the invention to provide inexpensive roofing elements having good weathering characteristics, which roofing elements present accentuated shadow effects in the weather portions thereof so as to give the appearance of increased depth and massiveness.

In carrying out the invention in one form a plastic coating is applied to a suitable foundation element and a portion of the coated element is provided with relatively coarse granules in quantities insufficient completely to surface the portion. Thereafter the entire surface of the coated element is provided with a quantity of fine granules so as to surface the one portion with intermingled coarse and fine granules and another portion with fine granules only. More specifically, the portion of the coated element which is to form the weather portion of the finished product is sparsely surfaced with the relatively coarse granules by dropping the coarse granules onto the coated element from a height sufficient to cause the granules partially to embed themselves in the coating, and an excess quantity of fine granules is applied to the entire surface of the element so as to surface the lap portion of the coated element with fine granules and so as to fill the interstices between the coarse granules on the weather portion of the element. Further, the element is passed between pressure applying means whereby fine granules are embedded in the plastic coating in the interstices of the weather portion and over the entire surface of the lap portion the pressing means for the weather portion being spaced apart sufficiently so that the coarse granules are not further embedded in the coating. The excess of fine granules is thereafter removed and the foundation element, which preferably constitutes a continuous web, may be passed through suitable cutting means for severing the granule surfaced web into shingles of desired shape and size.

In some cases it may be desirable to deposit the coarse granules by dropping them from a height which is not sufficient to partially embed the granules in the coating, and to thereafter secure the desired degree of embedding by applying pressure either directly on the coarse granules or through the excess of fine granules applied over the coarse granules.

For a more complete understanding of the invention reference should now be had to the drawing, in which:

Figure 1 is a somewhat diagrammatic elevational view of an apparatus embodying the present invention which apparatus constitutes one means for carrying out the improved method hereinafter described and claimed;

Fig. 2 is a partial plan view of the apparatus shown in Fig. 1;

Fig. 3 is a plan view of a roofing shingle embodying the present invention; and

Fig. 4 is an enlarged sectional view taken along the line 4—4 of Fig. 3.

Referring now to Figs. 1 and 2 of the drawing, in the manufacture of improved roofing materials embodying the present invention a foundation element 10, which in the embodiment here shown preferably constitutes a sheet or web of saturated roofing felt, is drawn from a suitable source of supply (not shown) by a plurality of feed and guide rolls 11 and 12, and a plastic coating 13, such for example as hot asphalt, is applied to one surface of the foundation element. Although any suitable means may be provided for applying the asphalt coating to the foundation element, in the present embodiment a plurality of delivery spouts 14 are arranged to deposit the asphalt on the top surface of the foundation element prior to passage of the element through a pair of doctor rolls 15 which form the coating material into a layer of uniform thickness. It will of course be understood that an asphalt coating may be applied in any suitable manner to both surfaces of the foundation element or web, if desired, in which case means may be provided for removing all but a thin coating layer from the bottom surface.

From the doctor rolls 15 the coated foundation element passes over a support 16 and beneath suitable granule supply means here shown as a pair of hoppers 17. These hoppers 17 are arranged, as shown, to deliver to selected portions only of the coated surface of the foundation element, a quantity of relatively large coarse granules 18. The areas upon which these coarse granules are deposited correspond to the portions of the foundation element which are to form the weather portions of the completed roofing elements formed by subsequently cutting the foundation element. These areas also extend slightly into the portions which are subsequently to constitute the lap portions of the completed element.

Although the invention is not limited to any particular size of granules, a very satisfactory product may be formed from granules of such a size as to pass through a 3 mesh or 4 mesh screen and to be retained on a 6 mesh or 8 mesh screen. Preferably, the granule supply hoppers 17 are arranged a sufficient distance above the upper surface of the coated foundation element so that the granules are dropped from a height such as to cause them partially to embed themselves in the plastic coating 13, thus obviating the necessity of pressing the granules into the coating as a separate operation. As shown in Figs. 1 and 2, suitable dividing walls 19 are provided below the hoppers 17 for confining the coarse granules 18 to the desired portions of the coated surface, and in accordance with the present invention, as indicated above, the quantity of granules delivered from the hopper 17 is insufficient completely to surface the portions of the coating 13 upon which these granules are deposited. In other words, the coarse granules 18 only sparsely cover the portions of the coating upon which they are deposited, and accordingly relatively large interstices or valleys of exposed asphalt are left between the granules.

The coated foundation element, selected portions of which are now sparsely surfaced with coarse granules, then passes beneath a second granule supply means, here shown as a hopper 20, which is arranged to supply to the entire upper surface of the coated foundation element a large quantity of relatively fine granules 21. These fine granules, which for example may be of such a size as to pass through a 12 mesh or 14 mesh screen and be retained on a 20 mesh or 24 mesh screen, are applied in sufficient quantity completely to cover the coarse granules 18 so as to fill the interstices or valleys between the coarse granules. Likewise, the fine granules completely cover those portions of the foundation element to which no coarse granules were applied.

After the delivery of the fine granules 21 to the upper surface of the coated foundation element, the foundation element is passed through suitable press rolls 22 and 23 and around a suitable guide roll 24. As shown, the press roll 23 which engages the granule covered surface of the foundation element is provided with portions 25 of reduced diameter, which portions correspond to the areas of the foundation element to which the coarse granules 18 were applied. Thus the portions of the press rolls which engage the coarse granule portions of the foundation element, are spaced apart a greater distance than the portions engaging the areas of the foundation element covered by fine granules only, this spacing of the press rolls being provided so as to prevent forcing the coarse granules deeper into the coating layer 13. The excess quantity of fine granules applied over the coarse granules prevents the coating 13 flowing up around the coarse granules and is effective to embed a quantity of the fine granules in the coating layer at the interstices or valleys between the coarse granules. Likewise, a quantity of fine granules is uniformly embedded in the portion of the foundation element to which the fine granules only are applied. As the granule surfaced coating element passes around the lower press roll 22, the excess quantity of fine granules drops off of the surface of the foundation element, a suitable trough or receptacle 26 being provided, as shown, to receive the excess of fine granules.

Thus, after the excess of the fine granules has been removed from the granule surfaced foundation element, there is produced an uneven surface on selected portions of the product thus formed in which the peaks are the coarse granules and in which the depressions between these granules are completely surfaced with fine granules. This difference in surface elevation is effective to accentuate the appearance of ruggedness and shadow lines.

While the invention is not limited to granules of any particular color, it has been found advantageous to use fine granules of a contrasting color with respect to the coarse granules. Thus, if the coarse granules are of a light color the use of a relatively dark color for the fine granules serves to accentuate further the shadow effects in the interstices or valleys between the coarse granules so as to give an impression of depth and massiveness to the weather portion of the completed element.

From the guide roll 24 the granule surfaced foundation element is led to suitable cutting means where, after being sufficiently cooled for example by passage through suitable "loopers" (not shown), the continuous web or sheet is cut into suitable roofing or siding elements. Thus, in the embodiments shown, the cutting means comprises an anvil roll 27 and a cutting roll 28 having a plurality of cutting blades 29 arranged at predetermined intervals about the periphery thereof, and a plurality of annular blades 30 so that as the continuous web or sheet passes between the cutting rolls 27 and 28 it is severed along the longitudinal lines 31, 32, and 33 (Fig. 2) and slotted at predetermined intervals to form shingle elements of the type shown in Fig. 3. Although the shingle element 34 shown in Fig. 3 is illustrated as having three tabs along the weather portion thereof, it will of course be understood that any desired number of tabs may be provided, the cutting roll 27 being also arranged to sever the web into lengths having the desired number of tabs. The tabs may, of coarse, be of any desired shape.

Although the web 10 is here shown as being of sufficient width to form four of the shingles 34 from each selected length thereof, the hopper 17 being arranged to apply coarse granules to two definite parallel strips, it will of course be understood that webs of any desired width may be provided, the hopper 17 being correspondingly arranged to sparsely surface selected areas, as desired, to form any suitable number of shingles from each selected length of the web.

As shown best in Fig. 4, the roofing element formed in accordance with the present invention is provided with a relatively thick weather portion, the coarse granules 18 being effective to increase the thickness of the weather portion and the interstices or valleys between the coarse granules are completely covered with fine granules 21, which granules also completely cover the lap portion of the shingle or roofing element.

While the improved roofing element as described above is preferably provided with a plastic coating of uniform thickness, it will be understood that the invention is not limited thereto as the plastic coating may, within the scope of the invention, be formed so as to provide a relatively thick coating on the area of the foundation element subsequently to be covered with coarse granules. This thick coating may be of uniform thickness or may be slightly tapered, but by properly proportioning the size and quantity of the coarse granules, the size and quantity of the fine granules, and the character of the pressing operation, the provision of such a relatively thick coating for receiving the coarse granules will in most cases be found unnecessary. It will likewise be understood that if desired a quantity of coarse granules may be applied to the bottom surface of the weather portion of the roofing element in order to increase the thick butt effect, or intermingled coarse and fine granules may be applied to selected portions of both the top and bottom surfaces of the roofing element.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A roofing shingle comprising a weather portion surfaced with intermingled coarse and fine granules and a lap portion surfaced with fine granules only, said coarse granules only sparsely covering said weather portion and said fine granules intermingled therewith being of substantially the same order of magnitude in size as said fine granules on said lap portion.

2. A roofing shingle comprising a base member having an asphalt coating of uniform thickness the weather portion of which is surfaced with intermingled coarse and fine granules to provide a thick butt and the lap portion of which is surfaced with fine granules only, the proportion of coarse granules in said intermingled coarse and fine granules being sufficient only sparsely to cover said weather portion and said fine granules intermingled therewith being of substantially the same order of magnitude in size as said fine granules surfacing said lap portion.

3. A roofing element comprising a base member having an asphalt coating one portion of which is surfaced with intermingled coarse and fine granules of different colors and another portion of which is surfaced with fine granules only of a uniform color, the proportion of coarse granules in said intermingled coarse and fine granules being sufficient only sparsely to cover said one portion and said fine granules intermingled therewith being of substantially the same order of magnitude in size as said fine granules surfacing said other portion.

4. A roofing shingle comprising a base member having an asphalt coating, the weather portion of which is surfaced with coarse granules to provide a thick butt, said coarse granules being spaced to provide valleys therebetween which valleys are surfaced with fine granules, and the lap portion of said asphalt coating being surfaced with fine granules only, said fine granules surfacing said valleys being of substantially the same order of magnitude in size as said fine granules surfacing said lap portion.

5. A roofing shingle comprising a base member having an asphalt coating, the weather portion of which is surfaced with coarse granules of one color embedded therein to provide a thick butt effect and spaced from each other to leave valleys therebetween which valleys are surfaced with fine granules of a different color to completely surface said weather portion and accentuate the shadow effect of said coarse granules, the lap portion of said shingle being surfaced with fine granules only of a uniform color, said fine granules surfacing said valleys being of substantially the same order of magnitude in size as said fine granules surfacing said lap portion.

FRANK B. BURNS.